United States Patent [19]

Horkey

[11] Patent Number: 4,919,483
[45] Date of Patent: Apr. 24, 1990

[54] COLLAPSIBLE AND REFORMABLE HEADREST FOR VEHICLES

[76] Inventor: Gregory R. Horkey, P.O. Box 3035, Monterey, Calif. 93942

[21] Appl. No.: 367,240

[22] Filed: Jun. 16, 1989

[51] Int. Cl.⁵ ............................................. A47C 7/38
[52] U.S. Cl. .................................. 297/395; 297/216; 297/391
[58] Field of Search ............... 297/216, 391, 395, 284, 297/DIG. 3; 248/118; 5/434, 435, 441, 442

[56] References Cited

U.S. PATENT DOCUMENTS

| | | | |
|---|---|---|---|
| 1,713,361 | 5/1929 | Zettel | 297/391 |
| 3,027,193 | 6/1959 | Graham | 297/391 |
| 3,680,912 | 8/1972 | Matsuura | 297/391 |
| 4,371,997 | 2/1983 | Mattson | 297/DIG. 3 |
| 4,607,886 | 9/1985 | Mazhar | 297/410 |
| 4,770,466 | 9/1988 | Pesterfield | 297/391 |

FOREIGN PATENT DOCUMENTS

| | | | |
|---|---|---|---|
| 929287 | 6/1973 | Canada | 297/DIG. 3 |
| 2856366 | 2/1980 | Fed. Rep. of Germany | 297/DIG. 6 |
| 3633867 | 4/1988 | Fed. Rep. of Germany | 297/284 |

*Primary Examiner*—Peter R. Brown
*Attorney, Agent, or Firm*—Warren F. B. Lindsley

[57] ABSTRACT

A headrest for securing to the window in the cab of a truck, or to any supporting surface in other types of vehicles, employing a cushion of porous plastic material surrounded by a nonporous material. The cushion has a port extending through the casing and into the porous material. A valve is mounted on the casing to control air flow through the port upon head impact with the cushion and substantially closing the port upon inflow of air through the port and into the cushion after impact. Means are mounted on the cushion for affixing it to the window of the cab of the truck or other surfaces in other types of vehicles.

3 Claims, 3 Drawing Sheets

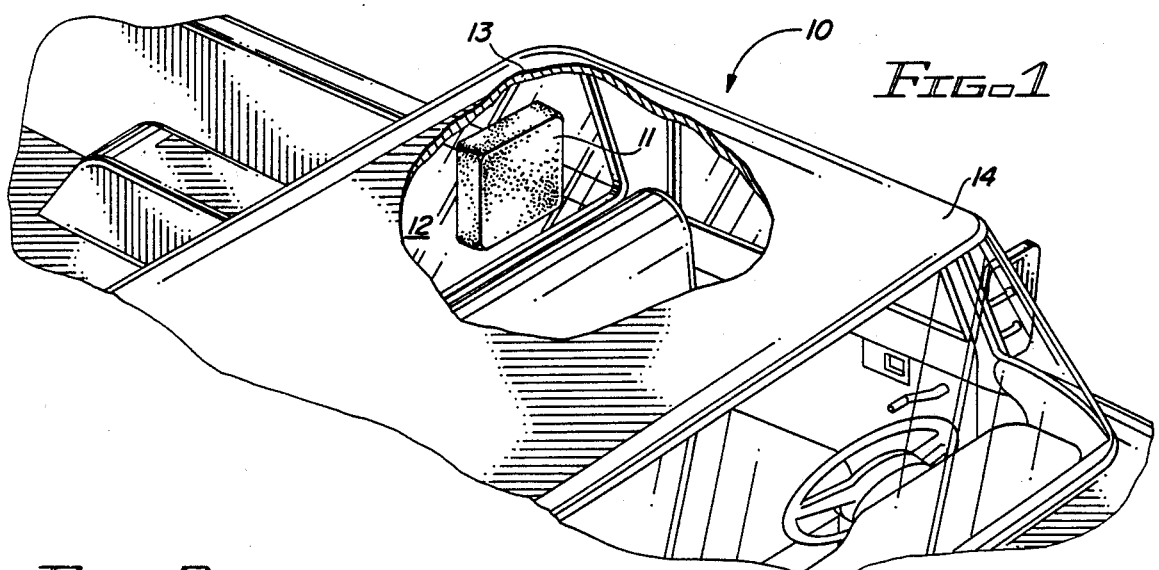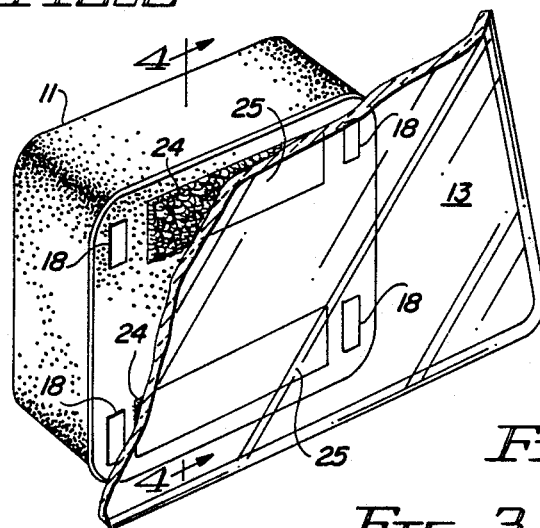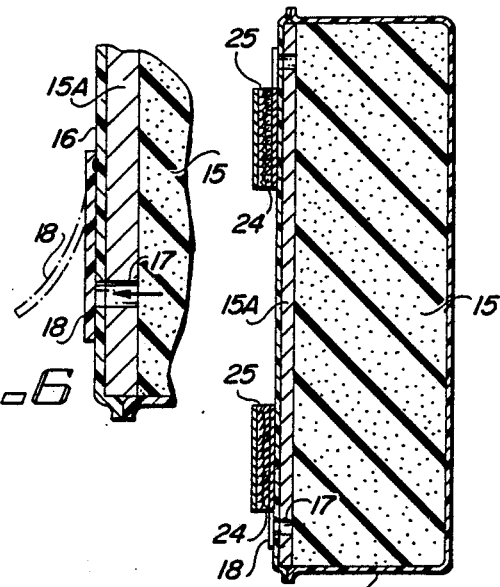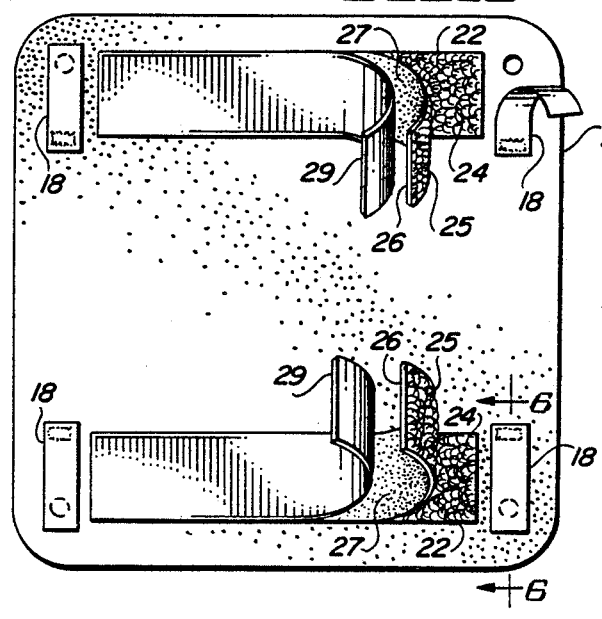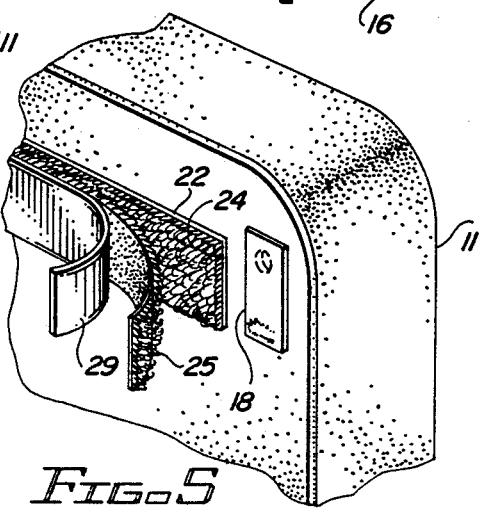

QUALITATIVE PERFORMANCE

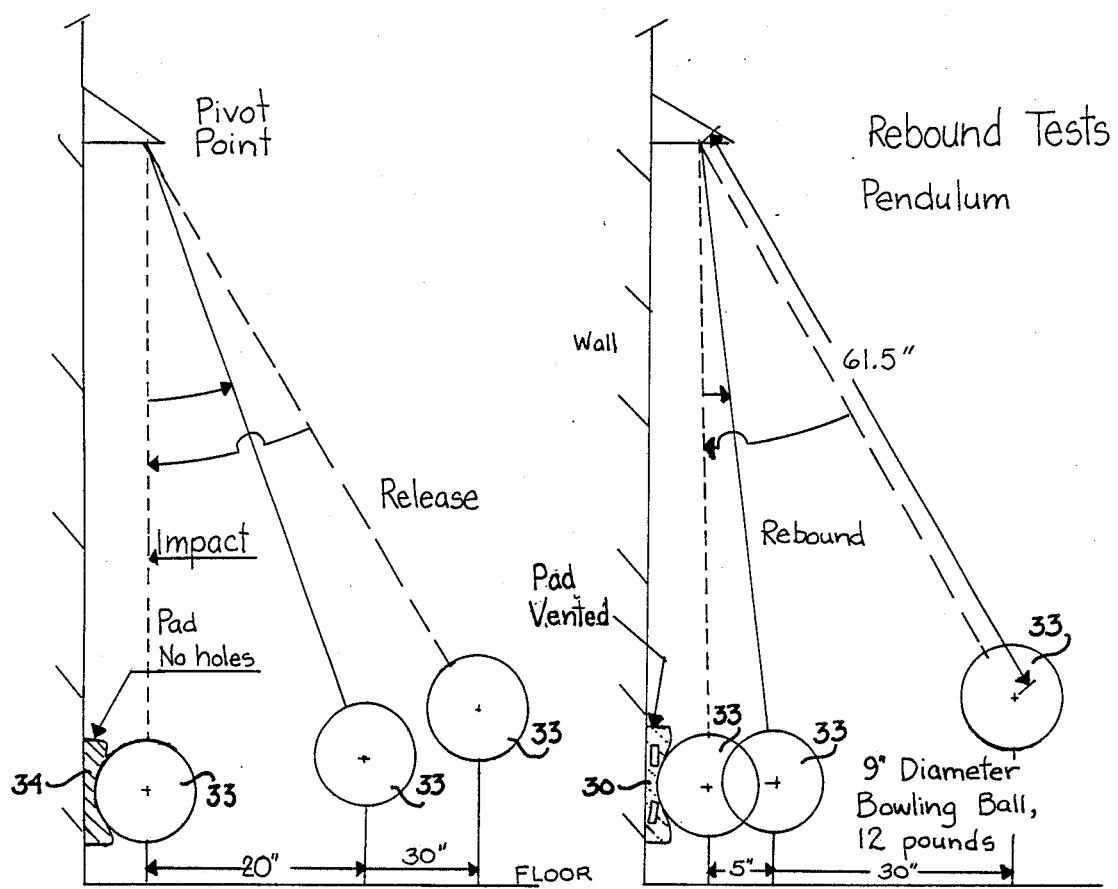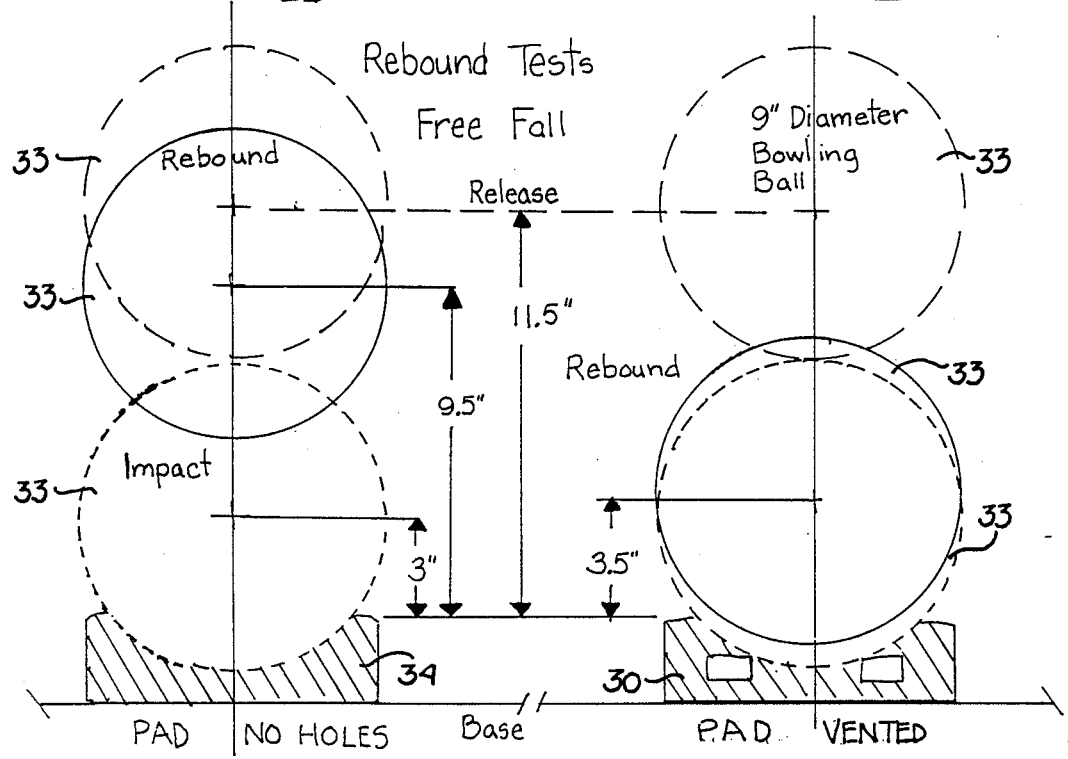

COLLAPSIBLE AND REFORMABLE HEADREST FOR VEHICLES

BACKGROUND OF THE INVENTION

This invention relates to headrests and more particularly to a soft cushion headrest which is supported by the rear window of a truck cab or other surface in other vehicles and which headrest collapses upon impact for energy absorption and then slowly regains its initial geometrical configuration, to prevent excessive rebound.

DESCRIPTION OF THE PRIOR ART

U.S. Pat. No. 3,680,912 discloses a headrest of the shock absorbing type to be fixed to the seat of an automobile. The headrest comprises a tubular hollow member filled with a fluid. When a shock is applied to the headrest the fluid inside the tubular hollow member flows into an absorbing hollow member communicating with said tubular member through a check valve.

U.S. Pat. No. 3,027,193 discloses a headrest for chairs that is vented to atmosphere.

U.S. Pat. No. 4,607,886 discloses a truck headrest which is adjustably mounted to the metal area of a cab beneath its rear window. The cushion is contoured to provide a number of support surfaces.

U.S. Pat. No. 4,383,713 discloses an orthopedic support apparatus for infants that employs VELCRO fasteners.

SUMMARY OF THE INVENTION

In accordance with the invention claimed, a new and improved headrest for pick-up trucks and other vehicles is disclosed which may be installed by the user of a truck or similar vehicle after purchase or become an add-on feature by the manufacturer for a new vehicle. Unlike prior art structures, this headrest deforms on impact by exhausting air through a novel valving arrangement and then in a controlled manner reforms to its original geometrical configuration.

It is, therefore, one object of this invention to provide a new and improved headrest for vehicles such as, for example, pick-up trucks.

Another object of this invention is to provide a new and improved headrest which is affordable as an aftermarket accessory.

A further object of this invention is to provide a collapsible and reformable headrest designed and constructed from inexpensive and desirable plastic materials.

A still further object of this invention is to provide a headrest which can be tightly attached to a window of a cab of a truck which provides reliable support to a user's head over long periods without altering the position of the headrest.

A still further object of this invention is to provide a truck headrest which is easily installed by an unskilled individual using a minimum of tools.

A still further object of this invention is to provide a truck headrest which is easily height adjustable and removable for sliding rear window use.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view, partially broken away, of a cab of a pick-up truck showing a headrest mounted on the rear window of the truck and embodying the invention;

FIG. 2 is an enlarged perspective view of the headrest shown in FIG. 1 and illustrating its attachment to the window of the truck;

FIG. 3 is a back view of the headrest shown in FIGS. 1 and 2;

FIG. 4 is a cross-sectional view of FIG. 2 taken along the line 4—4;

FIG. 5 is an enlarged perspective view of one corner of the headrest shown in FIG. 3;

FIG. 6 is a cross-sectional view of FIG. 3 taken along the line 6—6;

FIG. 11 diagramatically illustrates the rebound of a bowling ball mounted on one end of a line as it impacts when swinging as a pendulum on a standard cushion;

FIG. 12 diagramatically illustrates the rebound of the pendulum mounted bowling ball shown in FIG. 11 when it impacts on a cushion embodying the invention;

FIG. 13 diagramatically illustrates the rebound of a bowling ball being dropped on a standard cushion; and FIG. 14 diagramatically illustrates the rebound of the bowling ball shown in FIG. 13 when it is dropped on a cushion embodying the invention.

DESCRIPTION OF THE PREFERRED EMBODIMENT

Figures 7, 8:
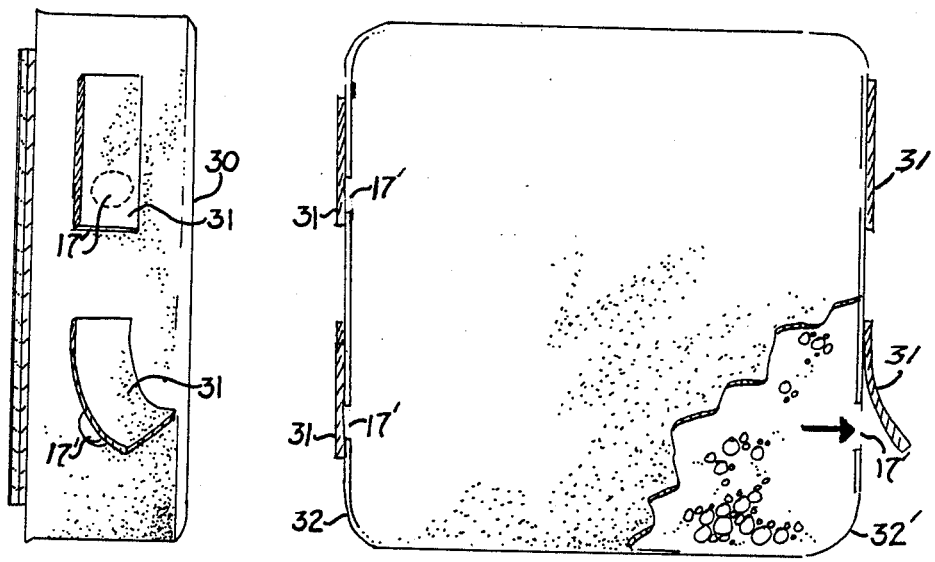
FIG. 7 is a left end view of a modification of the headrest shown in FIGS. 1-6 wherein one of the flap valves is shown partially open.
FIG. 8 is a front view of the cushion shown in FIG. 7 illustrating a pair of flap valves at each side of the cushion.

Referring more particularly to the drawings by characters of reference, FIG. 1 is a partial perspective view of a pick-up truck 10 having a headrest 11 mounted on the inside surface 12 of a rear window 13 within a cab 14 of the vehicle. It should be noted that even though the cushion embodying the invention is shown mounted on the back window of a pick-up truck, it may be mounted in any type of vehicle on any supporting surface and still fall within the scope of this invention.

Headrest 11 comprises a cushion of any suitable geometrical configuration which is shown herein as having a rectangular cross-sectional configuration of substantially 7½ by 7½ inches square and a thickness of either 2 or 4 inches in size. This cushion may be constructed out of a variety of readily available materials such as fire rated vinyl skinned polyurethane foam or plastic or leather covered polyurethane or other medium density plastic foam.

In accordance with the features of the headrest claimed herein, the cushion of the medium density plastic foam 15 mounted on a backing board 15A covered by a suitable plastic or leather covering 16 is vented to atmosphere by a suitable opening 17 in the backing board 15A and covering 16 that is controlled by a flap valve 18 formed of a thin pliable material. Thus, air interlaced in the pores of foam 15 upon impact of an object such as the head of a driver or rider in the vehicle drives or forces air under pressure through opening 17 and against flap valve 18 which opens, causing the air in the cushion to vent to atmosphere.

After cessation of the force of impact of the head of the person using the headrest, atmospheric air flows back into the pores of the plastic foam through opening 17 with flap valve 18 rapidly closing opening 17, thereby restricting the air flow back into the cushion.

Since flap valve 18 may be formed of any resilient material such as plastic or paper it will slowly assume its inactive position as shown in full lines in FIG. 6 upon the cushion assuming its normal expanded position as shown in FIG. 4.

In order to easily attach headrest 11 to the inside surface 12 of the back window 13 in cab 14 of pick-up truck 10 or any other support or window in other types of vehicles, one or more VELCRO strips of loop engaging members may be applied to its back surface horizontally, vertically or in any other recitable configuration and fall within the scope of this invention.

These VELCRO strips may each comprise a first member 2 suitably secured to the back of the outer surface of headrest 11 with its exposed surface 24 intended to engage in the known interlocking manner with a second mating surface 25 of a second member 26. An opposed surface 27 of member is provided with an adhesive covered by a tear away paper strip 29.

When it is intended to secure headrest 11 to a window surface of the cab of a vehicle, the tear away paper strip 29 is removed from member 26 of each VELCRO strip used after member 26 is detached from member 22 in the known manner. The adhesive surface of member 26 is then attached, i.e., glued, to a predetermined position on the glass surface of the rear window in the cab of the vehicle. This function is repeated for each VELCRO strip used on the headrest. After members 26 are secured to the cab window, the VELCRO surface of members 22 on headrest 11 are then matingly engaged with the exposed VELCRO surfaces of members 26 to secure headrest 11 to the surface 12 of window 13.

It should be noted that the flap valve 18 may comprise a rectangular or suitably shaped strip of resilient paper or plastic material glued or otherwise secured at one end to the back of the headrest and in position to open and close the port or opening 17 in a controlled manner under the effects of pressure on exhausting of the air in plastic foam 15 or the effects of vacuum on the refilling of the pore openings of the plastic foam 15.

FIGS. 7 and 8 illustrate a modification of the headrest shown in FIGS. 1-6 wherein headrest 30 comprises a cushion similar to the cushion shown in FIGS. 1-6 but differing in that flap valves 31 are provided one or more on each side 32, 32' of the cushion. These flap valves operate in the same manner as theretofore explained for controlling openings 17'.

It should be noted that in headrest use when a sudden and strong shock is added to the head as in the case of rear end collision, the head sinks into the elastic layer of the headrest and is pushed out toward the front of the headrest by the repulsive force of this elastic layer. Thus, it is the object of these headrests to provide an apparatus which will absorb a sudden shock of a human head without causing strong repulsion forces.

In accordance with the headrest claimed, the headrest is provided with a port extending through the backing board and the casing to atmosphere which port is controlled by a valve. This valve is opened under pressure of air being expelled from the cushion when a compression force is applied thereto and substantially closes the port when air is drawn back in under vacuum conditions from the atmosphere so as to control the repulsive forces which occur by air moving back into the cushion under the vacuum conditions caused by the force of the shock of the head initially applied to the headrest.

In order to control and greatly eliminate the repulsion forces, the air flowing back into the cushion from atmosphere must be controlled, thereby greatly reducing the total force applied to the head of the user of the headrest.

Figure 9:
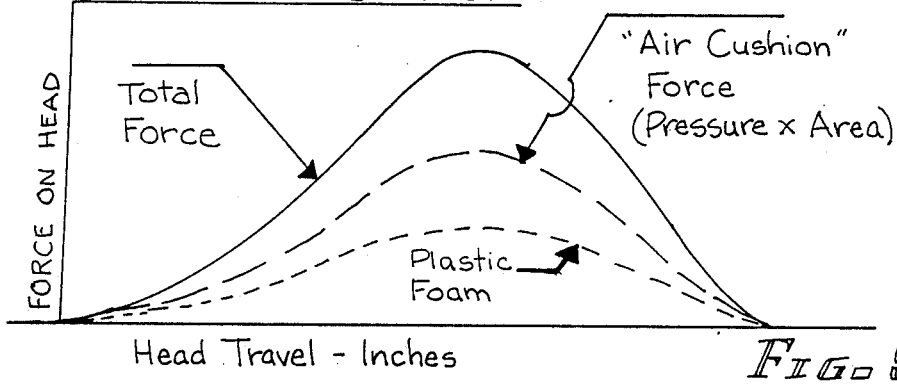
FIG. 9 illustrates forces applied to a head by a standard cushion versus head travel.

FIG. 9 illustrates forces applied to the head versus head travel. As the head goes back against the headrest, the plastic foam builds up a resisting force and then as the head stops and starts going forward again that force decreases. These two forces can be added together to give the total force applied to the head of the user of the headrest.

If orifices are properly sized and positioned in the headrest, the forces on the head decrease. If flapper valves are used over the orifice holes, they will deflect outwardly as the air is expelled from the cushion and then as the air tries to get back into the cushion again, these flapper valves substantially seal off the orifice holes or ports.

Figure 10:
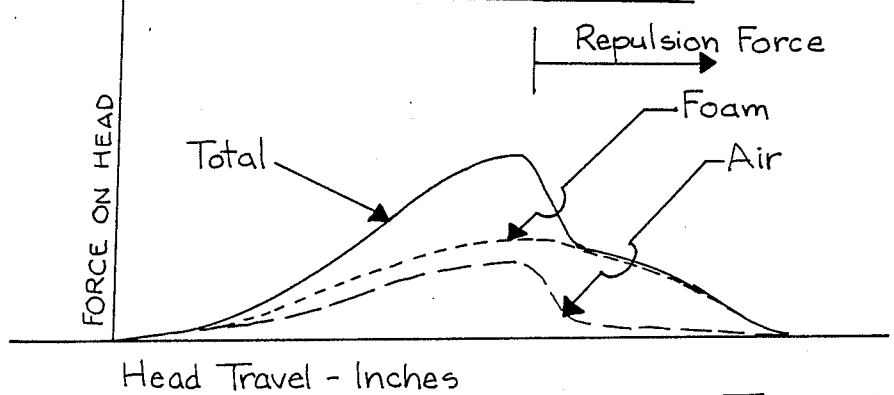
FIG. 10 illustrates forces applied by a head to a cushion versus head travel employing the invention.

FIG. 10 shows that the force on the head when using orifices and flapper valves as described herein is greatly reduced from that shown for standard cushion use and it should be noted that the distance of travel of the head in inches is greatly reduced when orifices and flapper valves are used versus orifices alone and/or the standard cushions as shown in the top two illustrations of FIG. 10.

FIGS. 11 and 12 illustrate the rebounding effect when a bowling ball 33 is pendulum mounted and moved to impact on a cushion of a headrest type.

In FIG. 11 bowling ball 33 impacts on a standard cushion 34 provided for headrest use.

FIG. 12 illustrates the same pendulum mounted bowling ball 33 impacting on a cushion involving the invention such as cushion 30 of FIGS. 7 and 8. As clearly noted from FIG. 12, the resulting rebound of the bowling ball 33 is substantially reduced indicating that the head of a user, if impacted on the headrest employing flap valves, would also be greatly reduced.

FIGS. 13 and 14 illustrate similar impact and rebounding test results with FIG. 13 illustrating bowling ball 33 dropping on cushion 34. FIG. 14 illustrates bowling ball 33 dropping down on cushion 30.

The diagrammatic illustrations of FIGS. 9-14 clearly illustrate the beneficial results of a flap valve type of structure for immediately releasing the air under pressure in the headrest and the subsequent readmission of atmospheric air into the cushion after impact.

Although but a few embodiments of the present invention have been illustrated and described, it will be apparent to those skilled in the art that various changes and modfications may be made therein without departing from the spirit of the invention or from the scope of the appended claims. For instance, the port opening could be surrounded with flexible material that would assist flow from the plastic foam and resist flow back into the foam. Likewise, careful sizing of the port (or ports), which acts as air flow orifices can expedite the flow (at the first, high impact pressure) and restrict the flow at the lower pressure differentials during the rebound cycle.

What is claimed is:

1. A headrest comprising:

a cushion, said cushion comprising a body of plastic foam containing a plurality of air filled pores and a casing of substantially nonporous material surrounding said body of plastic foam, a port extending from atmosphere through said casing into contact with said pores, a flap valve for controlling said port, said flap valve comprising a resilient strip of material adhesively attached at one end to said casing and covering said port at its other end, said valve opening under pressure of air being expelled from said pores of said cushion to atmosphere upon a compression force being applied to said cushion and rapidly closing said port when air under vacuum conditions is drawn from atmosphere into said pores of said cushion through said port upon cessation of the compression force, thereby causing said cushion to gradually return to its original configuration, and hook and loop fastening means mounted on said cushion, said fastening means comprising a first member secured to said cushion and providing a first surface for interlockingly engaging a second surface of a second member when an opposed surface thereof is adhesively attached to a window of a vehicle.

2. The headrest set forth in claim 1 wherein:

said sheet of nonporous material comprises a plastic.

3. A headrest comprising:

a cushion, said cushion comprising a body of plastic foam containing a plurality of air filled pores and a casing of substantially nonporous material surrounding said body of plastic foam, a port extending from atmosphere through said casing into contact with said pores, a flap valve for controlling said port, said flap valve comprising a resilient strip of material adhesively attached at one end to said casing and covering said port at its other end, said valve opening under pressure of air being expelled from said pores of said cushion to atmosphere upon a compression force being applied to said cushion and rapidly closing said port when air under vacuum conditions is drawn from atmosphere into said pores of said cushion through said port upon cessation of the compression force, thereby causing said cushion to gradually return to its original configuration, and fastening means mounted on said cushion for securing said cushion to a window of a vehicle.

* * * * *